United States Patent

[11] 3,624,713

| [72] | Inventor | Leonard Z. Goldberg<br>Canoga Park, Calif. |
|---|---|---|
| [21] | Appl. No. | 860,259 |
| [22] | Filed | Sept. 23, 1969 |
| [45] | Patented | Nov. 30, 1971 |
| [73] | Assignee | Lockheed Aircraft Corporation<br>Burbank, Calif. |

[54] LOAD-LIMITING FASTENING DEVICE
5 Claims, 2 Drawing Figs.

[52] U.S. Cl. .................................................. 73/141 A,
254/54
[51] Int. Cl. .................................................. G01l 5/06
[50] Field of Search ........................... 254/54, 67;
85/62, 61; 73/141 A, 143, 144

[56] References Cited
UNITED STATES PATENTS

| 1,020,748 | 3/1912 | Dobson | 254/54 |
| 2,337,629 | 12/1943 | Shortell | 85/62 |
| 3,372,581 | 3/1968 | Tell | 73/141 A |
| 3,304,772 | 2/1967 | Campbell | 73/139 |

FOREIGN PATENTS

| 827,850 | 2/1938 | France | 73/141 A |

Primary Examiner—Robert C. Riordon
Assistant Examiner—Roscoe V. Parker, Jr.
Attorneys—George C. Sullivan and Lowell G. Turner ABSTRACT: A load-limiting fastening device is disclosed which is used so as to visually indicate when a desired load has been placed on a bolt. The device includes conventional trunnions and a trunnion stem which are adapted to be located around a bolt extending through the stem. A series of Bellville spring washers are held with respect to the end of the stem remote from the trunnions by a moveable retainer. When a bolt is located so as to extend through the stem, the spring washers and the retainer and when the nut is torqued down on the bolt, pressure is applied so as to tend to compress the washers and so as to simultaneously move the retainer. Indicator means such as a groove are provided on the stem so that the position of the retainer with respect to such indicator means will indicate the loading on the bolt.

PATENTED NOV 30 1971

3,624,713

INVENTOR.
LEONARD Z. GOLDBERG
BY George Sullivan
Lowell H. Turner
Agents

3,624,713

A LOAD-LIMITING FASTENING DEVICE

BACKGROUND OF THE INVENTION

The need for correct loading of bolts is particularly apparent in the field of load-limiting devices such as are used for hose clamps and the like. Such devices are normally utilized with a T-bolt in such a manner that the head of the bolt is positioned with respect to takeup loops or members at one end of an band and in such a manner, means such as trunnions on the device engage similar loops or members on the other end of the device with the bolt being located so as to extend through a stem on the trunnion device. With this type of structure when a nut is torqued down upon the bolt the head of the bolt and the trunnions are drawn together as a result of the load placed upon the bolt.

The loading placed upon such a bolt is frequently very critical because of reasons which are unimportant to an understanding to this invention. A number of different expedients have been proposed and to varying extents utilized so as to control the load placed upon bolts. It is considered impractical to attempt to summarize in this specification all of such expedients. Common torque wrenches are frequently utilized to obtain the correct tensioning of bolt. Such wrenches are relatively inconvenient to utilize. Frequently such wrenches are considered to be inaccurate.

Trunnion devices such as are described in the preceding are of such a character that at times it is difficult to use conventional torque wrenches or the like with them. Frequently this is a result of the locations where such torque wrenches are utilized. Also, it is believed that on many occasions proper tensioning of a bolt held by a trunnion device as described has not been achieved because of the unavailability of any convenient device or structure capable of indicating when proper bolt tension has been achieved. In this field there is a need for consistent, accurate bolt loading in order to prevent failure.

SUMMARY OF THE INVENTION

An objective of the present invention is to provide new and improved load-limiting fastening or trunnion devices of the type described which when used as herein described visually indicate or show when a desired bolt loading has been achieved. A related objective of this invention is to provide such devices as indicated in which the means for indicating desired bolt loading has been achieved are incorporated within such devices s integral parts of them.

Further objectives are to provide such devices as described which are highly desirable because: they can be manufactured at a comparatively nominal cost; they can be used so as to obtain consistent, accurate bolt loading; and they are capable of giving such performance over a prolonged period. Because such devices as herein indicated include means for indicating bolt loading, it is believed that such devices are significantly beneficial. Such means cannot be lost and are always accessible in location wherein a device as described is used.

These and various related objectives of the invention are achieved by forming such device so that it includes in addition to the engaging appropriately such as aligned trunnions and a hollow stem attached to such engaging means Bellville washer means located so as to bear against the end of the stem remote from the engaging means and a movable retainer means so as to hold these washer means in this position. With this structure when the washer means are compressed, as by torquing down the nut on bolt extending through the stem, the retainer means is moved with respect to the stem. When the stem is appropiately marked, an inspection of the position of the retainer means relative to such marking or indicia, provides a determination as to whether a correct loading has been placed upon the bolts as a result of tightening such a nut down.

BRIEF DESCRIPTION OF THE DRAWING

Further details of the invention are best explained by referring to the accompanying drawing which.

Figures 1, 2:
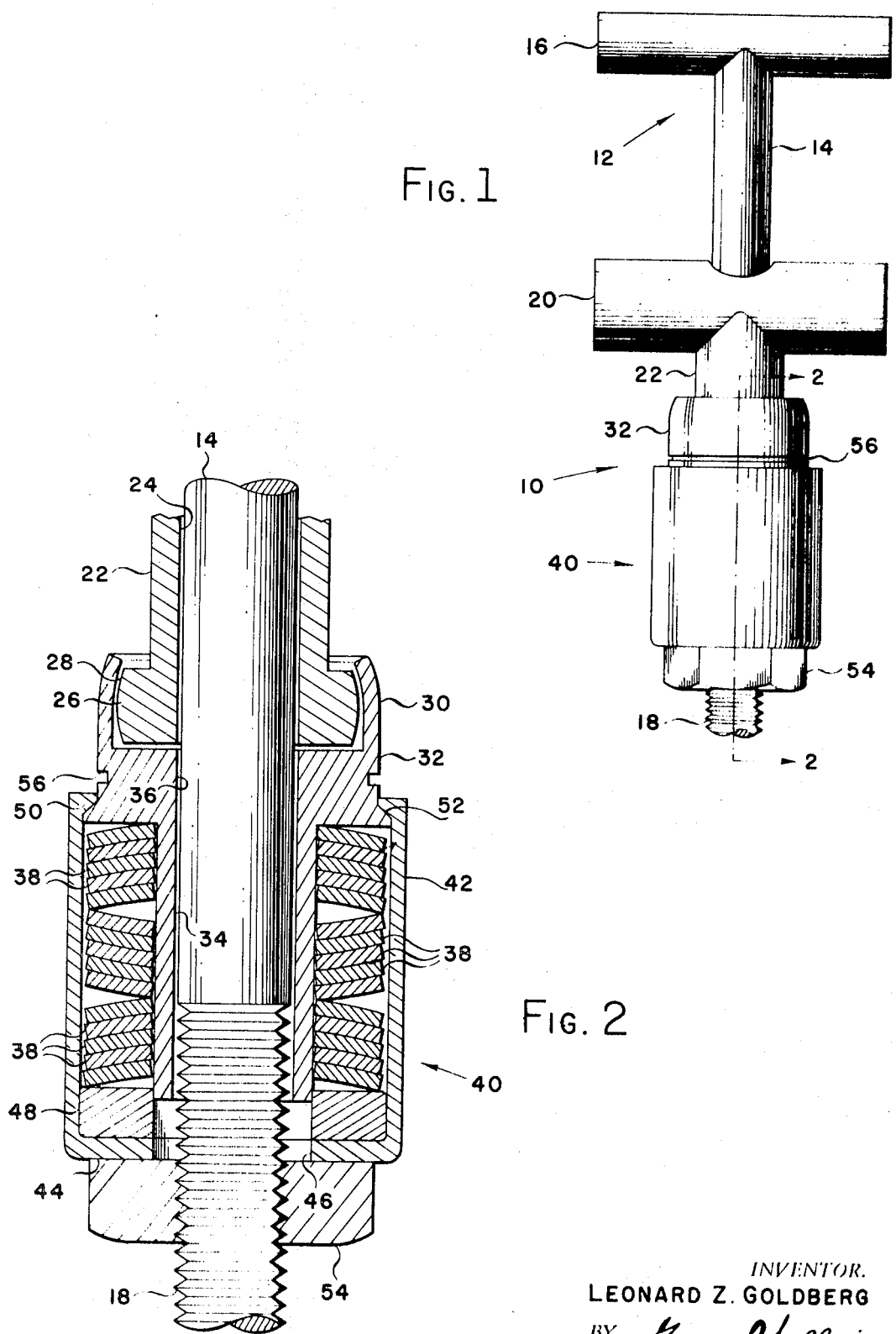
FIG. 1 is an elevational view of a presently preferred embodiment or form of a load-limiting fastening device of this invention assembled together with a T-bolt.
FIG. 2 is a partial cross-sectional view taken at line 2—2 of FIG. 1.

The accompanying drawing primarily is intended so as to clearly indicate the nature of a presently preferred embodiment in the form of a trunnion device of the invention. Through the use of routine engineering skill or ability it is possible to utilize the essential features of the present invention in other somewhat differently appearing and differently constructed devices which utilize the features embodied with the preferred embodiment of the invention illustrated.

DETAILED DESCRIPTION OF THE PREFERRED EMBODIMENT

In the drawing there is shown a load-limiting fastening device 10 in use with a conventional T-bolt 12. This T-bolt 12 includes a conventional shank 14 having a bar-shaped head 16 and a threaded end 18. The device 10 includes aligned, attached trunnions 20 secured to a stem 22. A hollow interior passage 24 traverses the shank 14 and extends between the trunnions 20. The head 16 and the trunnions 20 may both be considered as "means for engaging" a member to which tension is to be applied since they are formed in accordance with conventional practice to engage the interiors of takeup loops on a conventional clamping band. Various equivalents may be substituted for the head 16 and the trunnions 20. These parts may be utilized with other structures than loops on a band.

The stem 22 carries an enlarged flangelike head 26 having a curved exterior surface 28. A substantially tubular flange 30 extending from an adapter body 32 is formed so as to fit around the surface 28 in order to hold the body 32 in place upon the stem 22. With this construction the body 32 in effect becomes a part of the stem 22. If desired the body 32 may be formed integrally with the stem 22.

This body 32 includes a central tube 34 which extends from the side of it remote from the flange 30. The tube 34 connects up with a centrally located hole 36 in the body 32. The hole 36 and the interior of the tube 34 in effect constitute an extension or a continuation of the passage 24 through which the shank 14 extends.

A plurality or series of aligned Bellville springs or washers 38 are located around the tube 34 in a stacklike configuration. It will be realized that such Bellville springs are dished discs with open center. Such springs are commonly used for cushioning heavy loads with a comparatively small amount of motion. The number of washers 38 used may be varied in accordance with the loading to be desired on the shank 14 of the bolt 12. The higher the loading the shank 14 is to withstand, the greater the number of washers that should be used.

It will be noted from na examination of the drawing that certain of the washers are oriented with respect to others of the washers so as to face in opposite directions. This is considered to provide for adequate spacing for compaction of the entire assembly of washers 38 so that adequate travel of a retainer 40 may be obtained to clearly indicate the load applied to the shank 14 during the use of the device 10.

The retainer 40 is cuplike. It includes an outer cylindrical wall 42 fitting around the washers 38 and a bottom 44 provided with a centrally located aperture 46. This aperture 46 is aligned with the passage and is larger than the shank 14 so as to accommodate the end 18 of the bolt 12. A rigid, conventional flat washer 48 is located on the bottom 44 so as to bear against a terminal washer 38 of the series of washers 38 described. The precise retainer 40 shown encases or covers the washers 38 and 48 so as to protect them from the accumulation of dirt or the like and from corrosion. This is considered important in achieving prolonged, satisfactory performance.

The tube 34 has a length such that it is in juxtaposition with bearing washer 48 and is dimensioned so as to fit within the washer 48 in such a manner as to act as a guide for the washer 48 as the bottom or base 44 of retainer 40 is moved during the use of the device 10. This assembly of the washers 38 and the retainer 40 is maintained generally on the tube 34 by means of a lip 50 on the wall 42 engaging a corresponding lip 52 formed on the body 32. These lips 52 and 50 can be considered as cooperating holding means because of their function.

During the use of the device 10 a conventional nut 54 or equivalent structure is threaded on the end 18 of the bolt 12. As this nut is tightened it will bear against the bottom 44 of the retainer 40. This will exert pressure on the washer 48 so as to cause force to be exerted against the series of washers 38. The configuration of this series will gradually change so the nut 54 is torqued down upon the shank 14. As such change occurs the retainer 40 will be moved generally towards the body 32 and the stem 22.

Because, the distance that the retainer 40 will be moved in this manner is proportional to the loading placed upon the shank 14 and the degree to which the washers 38 are compressed it is possible to locate in the body 32 a small groove 56 at a location corresponding to a precise predetermined loading. When the retainer 40 has been moved as described until the lip 50 is opposite this groove 56 this predetermined loading is achieved.

Because of the function of the groove 56 is can be considered an an "indicating means" for providing a visual indication of the loading placed upon a bolt such as the bolt 12. If desired, equivalents of the groove 56 such as graduation on the body 32 may be used. A groove is considered preferable as an indicating means since there is not danger of such a groove becoming impossible to locate as a result of the accumulation of dirt or the like.

With the preferred embodiment of the device the distance between the tube 34 and the wall 42 is also such that the washers 38, circumscribing tube 34 and retained within wall 42, can never be flattened out by force applied to what may be regarded as a center line or flat position. So long as the washers cannot be flattened there is no danger of their snapping to an overcenter position opposite from their original configuration upon the release of force applied to them. If they were moved to such an overcenter position, it is considered that their spring rate characteristics would change, and that this would to a degree affect the accuracy of the groove 56 in its particular location as indication of a precise, predetermined loading.

One of the major advantages achieved with the device 10 is the reliability of this device in consistently and accurately indicating the loading on a bolt or the like. The device 10 accomplishes such an indication of bolt loading at loads which cannot be satisfactorily indicated through the use of conventional coil springs. Such accuracy is provided by the device 10 with a comparatively small amount of movement which, although comparatively small, is adequate to give a indication of a precise, desired loading.

I claim:

1. In a load-limiting fastening device including an open-ended cup-shaped retainer having a cylindrical wall with an apertured base formed thereon at its end opposite its open end, means for engaging a member to which tension is to be applied, and indicating means for indicating the loading of a bolt or the like extendable throughout said device, the improvement comprising,
    a hollow stem having outwardly flaring lip means,
    annular inwardly flaring lip means mounted on said retainer at its open end for cooperatively engaging said outwardly flaring lip means on said hollow stem,
    whereby said lip means engagingly cooperate until said retainer is compressed by the torquing down of a nut upon the bolt or the like extending through said device,
    spring means mounted in said cup-shaped retainer,
    a bearing washer seated on said apertured base for engagement with said spring means
    a tube mounted on said stem and having its length extending inwardly of said retainer and lip means to a juxtaposition with said bearing washer,
    said tube of such length and dimensions so as to be capable of fitting within said bearing washer upon torquing of said device,
    said indicating means being mounted on said stem exteriorly of said retainer at a location corresponding to a precise predetermined loading,
    said lip means on said retainer disengaging from said flared out lip means on said stem to cooperate with said groove by approaching it as torque on the bolt or the like increases, thereby providing for indication of the loading on the bolt or the like.

2. In the combination of claim 1, said stem comprising an enlarged flangelike head having a curved exterior surface a substantially tubular flange, and
    an adapter body from which said flange extends,
    said flange fitting around said curved exterior surface of said head,
    said indicating means located on said adapter body.

3. The combination of claim 2 in which said indicating means comprises an annular groove 4. The combination of claim 2 in which said spring means comprises
    a plurality of series of Bellville spring washers stacked in said cup-shaped retainer between said bearing washer and enlarged head,
    some of the series of Bellville spring washers facing one direction and other of the series of Bellville spring washers facing the other direction,
    said Bellville spring washers circumscribing said tube and retained within said cylindrical wall being prevented from overcentering from their original configuration.

5. The combination of claim 4 in which said indicating means comprises an annular groove.

* * * * *